Patented May 22, 1951

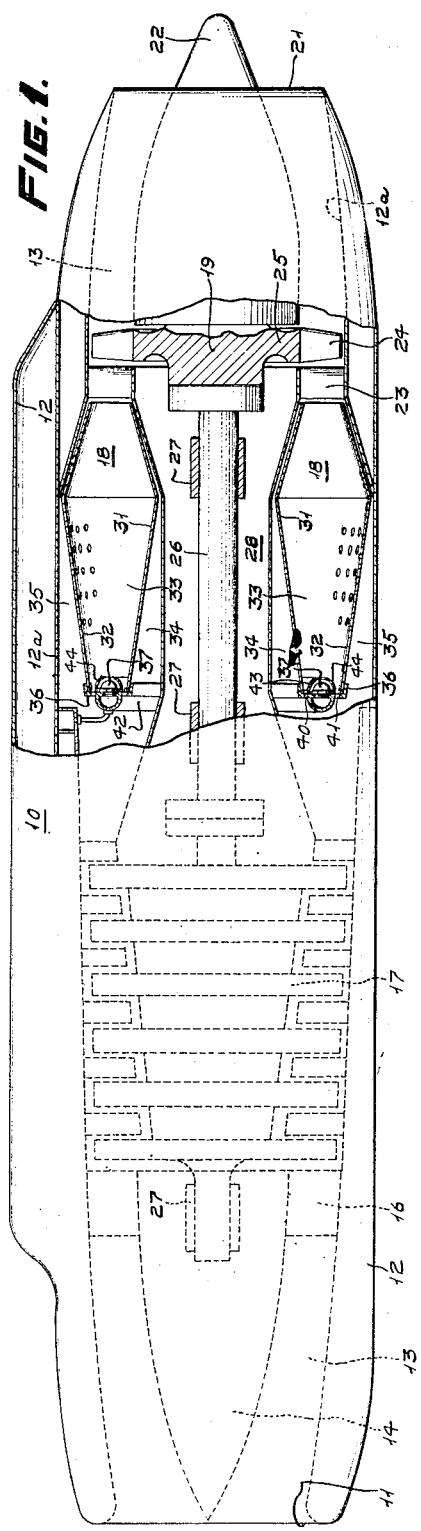

2,554,401

UNITED STATES PATENT OFFICE 2,554,401

COMBUSTION APPARATUS PROVIDED WITH GAS BACKFLOW-INDUCING MEANS ADJACENT THE NOZZLES

Willard L. Christensen, Moylan, and Arnold H. Redding, Swarthmore, Pa., assignors, by mesne assignments, to the United States of America as represented by the Secretary of the Navy Application July 18, 1946, Serial No. 684,481

1 Claim. (Cl. 60—44)

This invention relates to combustion apparatus, more particularly to combustion chamber structure, and has for an object to provide novel structure of this character.

Another object of the invention is to provide a burner chamber to which fuel is admitted through a plurality of atomizing nozzles, together with means for inducing backflow of hot gases in the vicinity of said nozzles to improve the mixing of fuel and air.

Yet another object of the invention is to provide combustion chambers to which fuel is admitted through atomizing nozzles, together with vanes so disposed in the chambers that entering air produces an ejector action entraining hot air and gases from the chamber and producing backflow of the latter.

These and other objects are effected by the invention as will be apparent from the following description taken in connection with the accompanying drawings, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged longitudinal sectional view of half of a combustion chamber such as shown in the power plant of Fig. 1;

Fig. 3 is an enlarged fragmentary sectional view of a portion of the structure shown in Fig. 2;

Figure 4:
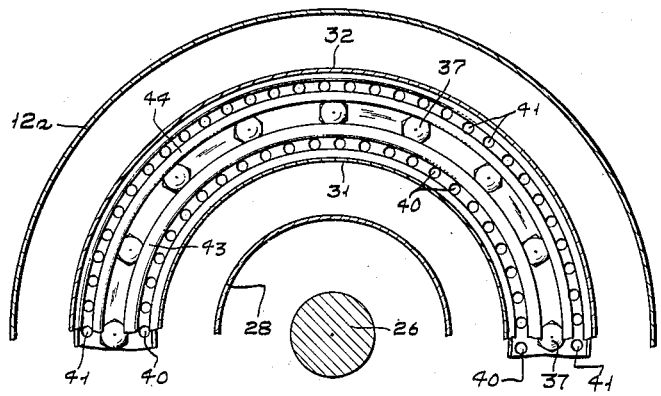
Fig. 4 is an enlarged transverse sectional view, taken along the line IV—IV of Fig. 2, looking in the direction indicated by the arrows.

The present invention, although not limited thereto, is particularly adapted for use with a gas turbine power plant of the type employed on aircraft to drive the propeller or an electric generator, or to supply motive fluid for jet propulsion of the aircraft. Such a plant preferably comprises a streamlined tubular casing having mounted axially therein a compressor adjacent the forward end or inlet, a turbine adjacent the rearward or discharge end, and combustion apparatus located between the compressor and the turbine for heating the compressed air and which discharges the hot gases at suitable temperature and pressure to the turbine. The spent gases on leaving the turbine are discharged through a nozzle provided at the rear of the casing and may aid in propelling the aircraft.

Referring now to the drawings more in detail, the power plant shown in Fig. 1, and indicated in its entirety by the reference character 10, is adapted to be mounted in or on the fuselage or wing of an aircraft with the left end, or intake 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial flow compressor 17, combustion apparatus indicated generally at 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus, are directed by suitable guide vanes or nozzles 23 against the blades 24 of the turbine disc 25 and then are discharged through the propulsion nozzle 21 to propel the aircraft.

By reference to Fig. 1, it will be seen that the compressor and turbine rotors are interconnected by means of a shaft 26 supported by suitable bearings 27 and enclosed by an inner wall structure, indicated generally 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 18, into an annular burner or combustion space 33 overlapped both inwardly and outwardly by annular air spaces 34 and 35, respectively. The inner wall 31 is disposed with its base or larger end upstream and the outer wall 32 has its larger end or base downstream, with the result that the burner space 33 defined thereby increases in cross-sectional area from its upstream end to its downstream end. Conversely, the inner and outer overlapping air spaces 34 and 35, the former defined by the walls 28 and 31 and the latter by the walls 12a and 32, decrease in cross-sectional area from their upstream ends to their downstream ends.

Preferably, the upstream end of the burner space 33 is closed by an annular wall 36, in which is mounted an annular series of fuel nozzles 37 adapted to direct the fuel discharging therefrom in directions substantially parallel to the longitudinal axis of the power plant.

In combustion apparatus of the type described above, it has been found desirable to have a "backflow" of hot gases through the fuel nozzle spray to facilitate fuel vaporization and mixing of fuel with primary air, thereby producing short and stable flames. To produce this highly desirable backflow of hot gases, the present invention incorporates the structure now to be described.

The annular end wall 36 is provided with inner and outer rows of openings 40 and 41, respectively, positioned between the fuel manifold 42 and the inner and outer annular side walls 31 and 32, respectively.

Within the burner space 33 and adjacent the end wall 36 and row of nozzles 37 are inner and outer vanes 43 and 44, respectively, disposed between the end wall openings 40 and 41, respectively, and the nozzles 37. The upstream ends of the vanes 43 and 44 are spaced from the annular end wall 36, as at 46, except for occasional legs 47 serving to support the vanes from the end wall 36.

In operation, air enters the burner space 33 from the air space upstream thereof through the two annular rows of openings 40 and 41 in the end wall 36, and flows longitudinally of the burner space between the side wall 31 and the vane 43, and between the side wall 32 and the vane 44, as indicated by the arrows A in Figs. 2 and 3. The flow of air between the vanes 43 and 44 and the side walls 31 and 32, respectively, produces an ejector action, at 46, causing counterflow of hot air and gases from the central portion of the burner space, this counterflow or backflow occurring between the vanes 43 and 44 and the nozzles 37. The counterflowing air and gases pass radially outward through the openings 46 between the upstream ends of the vanes and the annular end wall 36, as indicated by the arrows B in Figs. 2 and 3, and join the streams A of entering air. Additional openings 49 are provided in the side walls 31 and 32 downstream of the nozzles for further admission of air to the burner space 33 for combustion and cooling purposes.

Figure 5:
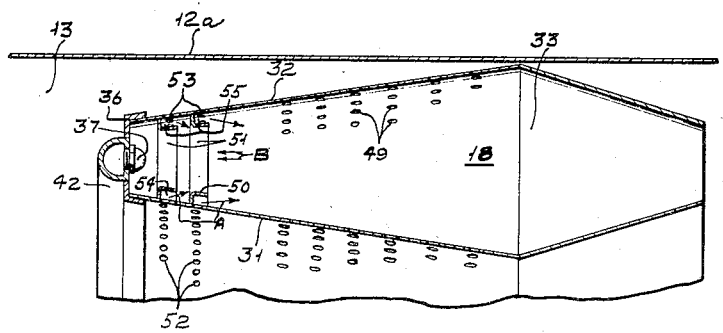
Fig. 5 is an enlarged fragmentary sectional view, similar to Fig. 3, but showing a modified construction.

In Fig. 5, there is illustrated a modified construction which differs from that described above in that inner and outer flanged vanes or rings 50 and 51, respectively, are secured to the side walls 31 and 32, respectively, within the burner space 33, in place of the vanes 43 and 44 of Figs. 1 to 4. The annular rows of holes 40 and 41 are omitted from the annular end wall 36, and rows of holes 52 and 53 are provided in the inner and outer walls 31 and 32, respectively, to admit air to the spaces 54 between the wall 31 and its associated flanged vanes 50 and to the spaces 55 between the wall 32 and its vanes 51.

It will be apparent that air entering the burner space 33 through the openings 52 and 53 is forced by the vanes 50 and 51 to flow as indicated by the arrows A (Fig. 5), this flow of entering air creating an ejector effect at the free edges of the vanes 50 and 51 causing backflow or counterflow of the heated gases in the central part of the burner space 33, as indicated by the arrows B.

While the invention has been shown in several forms, it will be obvious to those skilled in the art that it is not so limited, but is susceptible of various other changes and modifications without departing from the spirit thereof.

What is claimed is:

In combustion apparatus, wall structure defining a burner space and an overlapping air space; said wall structure including an annular side wall separating said burner space and said overlapping air space; an end wall closing said burner space at its upstream end, considered in the direction of gas flow therethrough; a nozzle in said upstream end and adapted to direct fuel towards the downstream end of said burner space; an annular vane disposed between said nozzle and said annular side wall and spaced slightly from the end wall, said end wall having a plurality of openings therethrough for admission of stream of air between said annular vane and said annular side wall, whereby said air passing said vane structure creates an ejector effect at the space between said vane structure and said end wall, thereby entraining hot air and gases from the vicinity of said nozzle and producing counterflow of said hot air and gases relative to the entering streams of air.

WILLARD L. CHRISTENSEN.
ARNOLD H. REDDING.

REFERENCES CITED

The following references are of record in the file of this patent:

UNITED STATES PATENTS

| Number | Name | Date |
|---|---|---|
| 657,228 | Trapp | Sept. 4, 1900 |
| 883,236 | Rehbein | Mar. 31, 1908 |
| 1,158,541 | Nolan | Nov. 2, 1915 |
| 1,450,229 | Robinson | Apr. 3, 1923 |
| 1,458,378 | Astrom | June 12, 1923 |
| 1,603,032 | Elze et al. | Oct. 12, 1926 |
| 2,072,731 | Crosby | Mar. 2, 1937 |
| 2,247,768 | Huwyler | July 1, 1941 |
| 2,368,179 | Turpin | Jan. 30, 1945 |
| 2,398,654 | Lubbock | Apr. 16, 1946 |
| 2,417,445 | Pinkle | Mar. 18, 1947 |

FOREIGN PATENTS

| Number | Country | Date |
|---|---|---|
| 371,056 | Great Britain | Apr. 21, 1932 |